INVENTOR.
JAMES L. D. MORRISON
BY
Lockwood, Galt, Woodard, & Smith
ATTORNEYS

INVENTOR.
JAMES L. D. MORRISON
BY
Lockwood, Galt, Woodard, & Smith
ATTORNEYS

INVENTOR.
JAMES L. D. MORRISON
BY
Lockwood, Galt, Woodard, & Smith
ATTORNEYS

April 12, 1960 J. L. D. MORRISON 2,932,520

PHONOGRAPH MECHANISM

Filed June 13, 1955 6 Sheets-Sheet 4

INVENTOR.
JAMES L. D. MORRISON
BY
Lockwood, Galt, Woodard, & Smith
ATTORNEYS

April 12, 1960 J. L. D. MORRISON 2,932,520

PHONOGRAPH MECHANISM

Filed June 13, 1955 6 Sheets-Sheet 5

INVENTOR.
JAMES L. D. MORRISON
BY
Lockwood, Galt, Woodard, & Smith
ATTORNEYS

INVENTOR.
JAMES L. D. MORRISON
BY
Lockwood, Galt, Woodard, & Smith
ATTORNEYS

United States Patent Office 2,932,520

Patented Apr. 12, 1960

2,932,520

PHONOGRAPH MECHANISM

James L. D. Morrison, Benton Harbor, Mich.

Application June 13, 1955, Serial No. 514,910

6 Claims. (Cl. 274—10)

This is a continuation-in-part of two applications, Serial No. 261,503 filed December 13, 1951, now abandoned and Serial No. 384,731 filed October 7, 1953.

This invention relates to phonograph mechanisms, and more particularly to carriage means for conveying stacks of phonograph records to and from record changing and playing mechanism.

Conventional phonographs of the manual and automatic type comprise a turntable, a tone arm and a stylus which are openly accessible to the operator. The manual phonograph is operated by placing records on a turntable, and then carefully positioning the stylus in the starting groove of the record. The automatic phonograph involves placing either one or a plurality of records on a suitable support and the manipulation of a control for causing the records to be sequentially handled and played.

The fact that the various components of the phonographs just mentioned are readily accessible for manual manipulation by an operator constitutes a principal source of trouble because of inexpert manipulation of such components. For example, it is common for a record to be dropped and broken when it is being placed on a turntable. It is common for a tone arm to be indavertently dropped on a record, thereby breaking the stylus or causing other similar damage. Still further, it has been a great source of trouble in automatic record changers in that the operator will jerk or move a tone arm out of adjustment when the mechanism is not in position to permit such movement.

From the foregoing it will now appear that proper operation of a phonograph requires some skill on the part of the operator. A child, for example, must be taught how to use the phonograph and why he should exercise great care in placing the stylus, for example, in the groove on the record. Indeed, even though an operator is skilled, he can and often does accidentally do something wrong which causes damage to the phonograph.

By virtue of this invention, the skill previously required of an operator is no longer needed. Furthermore, conditions which have previously existed which conduce to accidental mishandling or improper operation of the phonograph mechanism are completely eliminated, thereby reducing to a minimum the chances of a machine becoming inoperative except for reasons due to inherent wear or weaknesses.

It is an object of this invention to provide a phonograph mechanism which is less susceptible to damage through inexpert operation or inadvertence than prior mechanisms.

It is another object of this invention to provide a phonograph mechanism wherein record handling by an operator is reduced to a minimum.

It is still a further object of this invention to provide a phonograph mechanism which is completely inaccessible to an operator whereby the component parts thereof cannot be manually manipulated.

Other objects will become apparent as the description proceeds.

To the accomplishment of the above and related objects, the invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figures 1, 2:
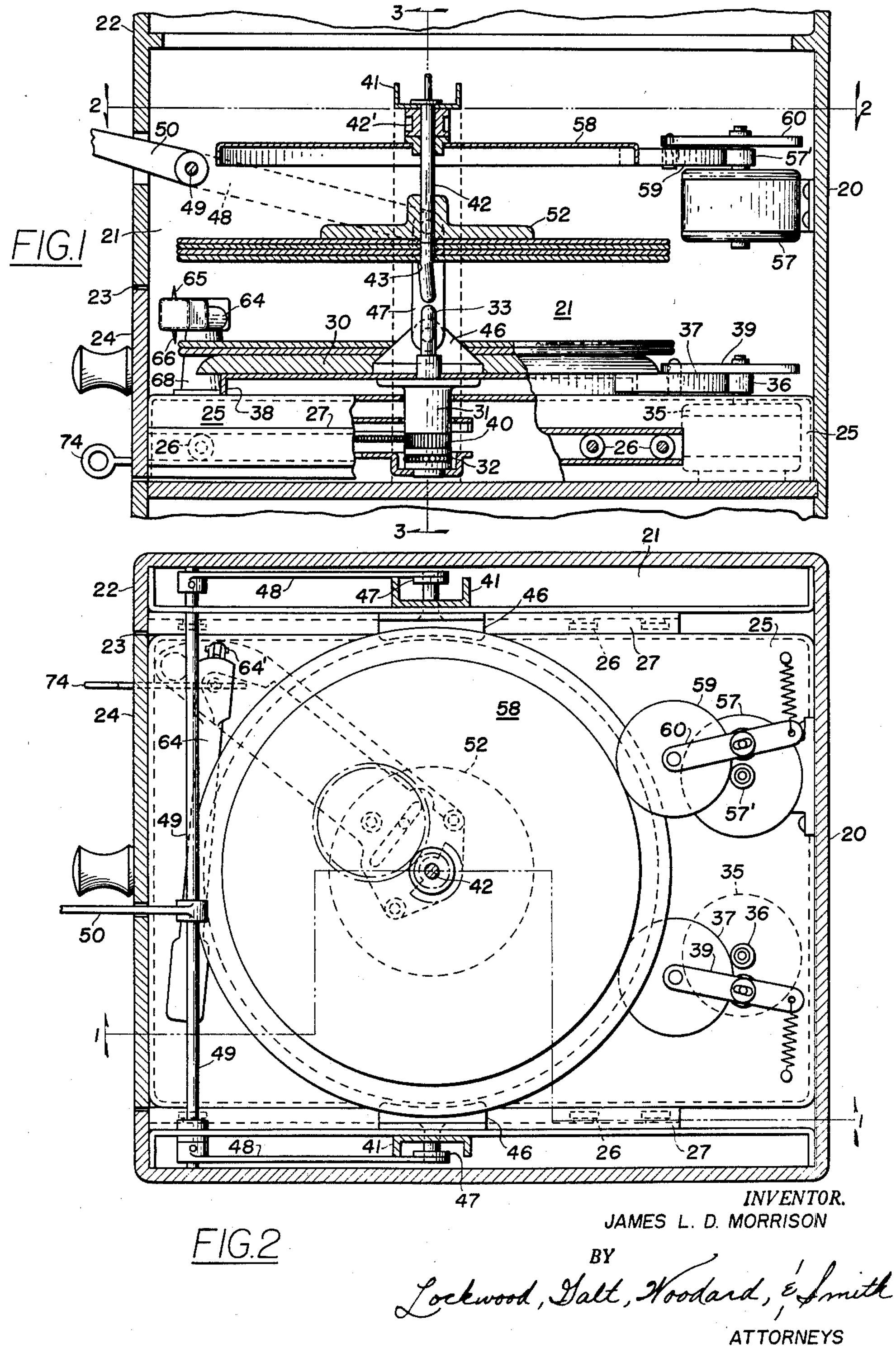
Fig. 1 is a vertical section of one embodiment of this invention.
Fig. 2 is a horizontal section taken substantially on section line 2—2 of Fig. 1.

The invention is exemplified in a cabinet 20, provided with a compartment 21 which encloses the phonograph. The compartment 21 if desired may be provided in a cabinet which also includes compartments for storing records and other instruments. The front wall 22 of the cabinet is provided with an opening 23 which is adapted to be closed by the front 24 of a slidable record loading drawer or support which includes a base or frame 25 which is fixed to front 24 and is provided with rollers 26 which are adapted to travel in channel tracks 27 which are fixed to the inner faces of the sides of compartments 21. The turntable 30 for record disks is mounted on and adapted to be driven by a shaft 31 which is journalled in a suitable bearing 32 supported in the base 25. An upstanding record loading and playing spindle 33 on the turntable 30 and fixed to shaft 31 is adapted to guide a group of record disks in a centralized position onto said turntable and to retain them thereon during operation of the turntable. When the drawer is pulled out of the compartment 21, the base 25 and spindle 33 will be positioned with clearance thereabove for loading a group of disks with records on both faces thereof onto the turntable and around said spindle. An electric motor 35 is mounted in base 25 and is adapted to drive the turntable 30 by means of friction gearing which includes a pulley 36 on the shaft of said motor, an idler pulley 37 and a disk 38 which is provided with a friction periphery engaged by pulley 37. Motor 35 and this friction gearing are movable with the base, so that the driving relation between the motor and turntable 30 is maintained in all positions of the drawer. Pulley 37 is mounted on a spring-pressed lever 39 holding pulley 37 in frictional engagement with flange 38 and pulley 36. The shaft 31 is provided with a pinion 40 which may be used to control record changing mechanism and a tone arm control device as well understood in the art.

When the drawer is moved into the cabinet, the spindle 33 and turntable are positioned for transferring the disks from turntable 30 to overlying mechanism which is mounted in the cabinet and includes a depending record-playing spindle 42 for centering and rotating the disks and playing or reproducing the record on the underface of each disk, and also for dropping the disks back onto the lower turntable for reproducing the records on the top face of the disks. Spindle 42 is journalled in a bearing on a fixed cross bar 41 and is provided with an offset 43 for releasably holding the disks thereon. A lever 44 pivoted in said spindle 42 is adapted to displace the lowermost disk of the stack from the offset 43 for dropping said disk onto the lower turntable 30 and reproducing the record on the upper face of the record.

The group of disks loaded on turntable 30 when the drawer is in its inner position are transferred from upstanding spindle 33 onto the offset 43 on spindle 42 by lifting mechanism which is mounted in the cabinet which comprises brackets 46 which are adapted to engage the side margins of the lowermost disk on turntable 30, suspension links 47 to the lower ends of which brackets are pivoted, arms 48 fixed to a shaft 49 which is journalled in the cabinet, and a lever 50 which is fixed to shaft 49 and protrudes from the front of the cabinet. When turntable 30 has been loaded with a group of disks and has been moved into the compartment 21, and the ends of spindles 33 and 42 will be vertically aligned, depression of lever 50 will shift brackets 46 which will engage the margins of the lowermost disk on turntable 30 and lift the group of disks so they will slide off spindle 33 onto spindle 42 until they are supported on offset 43 of spindle 42. The disks will then be rotatable for reproducing the records on their underfaces.

A weight or follower 52 slidable on spindle 42 above offset 43 is adapted to hold the disks on said offset. A cam surface 53 on one side of stem 42 is adapted to move the disks laterally over said offset. The records on the underface of the disks may be reproduced while the disks are retained on spindle 42. Lever 44 with an abutment 44*a* is adapted to displace the lowermost disk from offset 43 to drop the disks onto the lower turntable 30, the spindles 42 and 33 in the holes in the disks guiding them to their centralized position on turntable 30. A pivoted and slidable dog 55 in spindle 42 is adapted to hold the disks above the lowermost disk against displacement from ledge 43 while the lowermost disk is displaced.

The spindle 42 and disks thereon are driven by mechanism which is mounted in the cabinet and includes an electric motor 57, a turntable or disk 58 which is fixed to spindle 42, a pulley 57' on the shaft of motor 57, and a spring-pressed idler pulley 59 engaging the peripheral face of disks 58 and pulley 57'. A spring-pressed stem 60 is slidably mounted in spindle 42 and has a cam engagement with lever 44 for operating the lever to singly displace a record from offset 43 onto turntable 30. The records on the upper face of each disk may then be successively reproduced. A pinion on spindle 42' may be used to any suitable mechanism for controlling the record changing device.

A tone arm 64 is mounted on the base 25 for lateral pivotal movement by the record on a disk and for vertical pivotal movement to engage and disengage the tone arm from the disks. The tone arm is provided with an upper needle 65 for engaging a record on the underface of a disk on spindle 42 and a needle 66 for engaging a record on the upper face of a record on turntable 30. Tone arm 64 is pivoted at 64' to a sleeve 67 which is vertically slidable and pivoted in a bearing 68 fixed on the base 25. A pin 69 is slidable in sleeve 67 and engageable with the tone arm for pivotally shifting it vertically. A stem 70 is slidable in the lower portion of sleeve 67. A spring 71 is interposed between and connects stem 70 and a bead on the lower end of pin 69. A stepped cam 73 is slidably mounted on base 25 for shifting the stem 70 to raise the tone arm for yieldingly engaging needle 66 with a disk on the spindle 42, and to lower the tone arm for engaging needle 66 with a disk on turntable 30. A handle 74 is provided on cam 73 for selectively setting the cam into either of its positions. When the cam 73 is in its forward position, it will hold pin 70 raised and through spring 71 and pin 69 the tone arm will be yieldingly urged upwardly for engaging needle 65 and the record on the under face of the lowermost disk on spindle 42, while the tone arm is free to be swung laterally with sleeves 67 which is rotatable in bracket 68. When the handle 74 is set inwardly, cam 73 will permit pin 70, spring 71 and pin 69 to slide downwardly in sleeve 67 and release the tone arm for vertical and horizontal swinging movement so that needle 65 will gravitationally engage the record on the upper face of a disk on turntable 30 and be free for lateral swinging movement by the record. Any suitable or well-known means may be used for shifting the tone arm laterally to one side of the path of the records between the turntable 30 and spindle 42.

Figure 4:
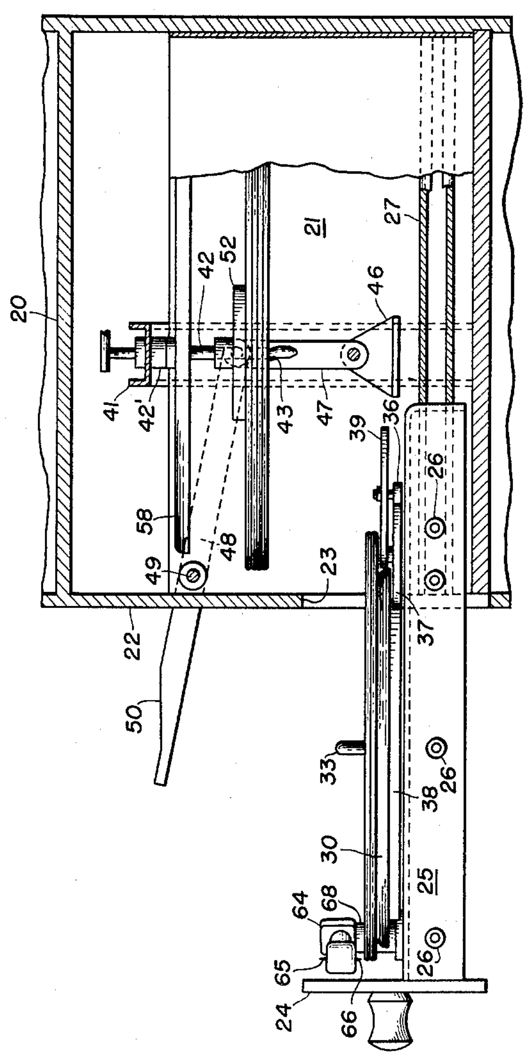
Fig. 4 is a similar sectional view showing the record carriage withdrawn from the cabinet.
Figure 3:
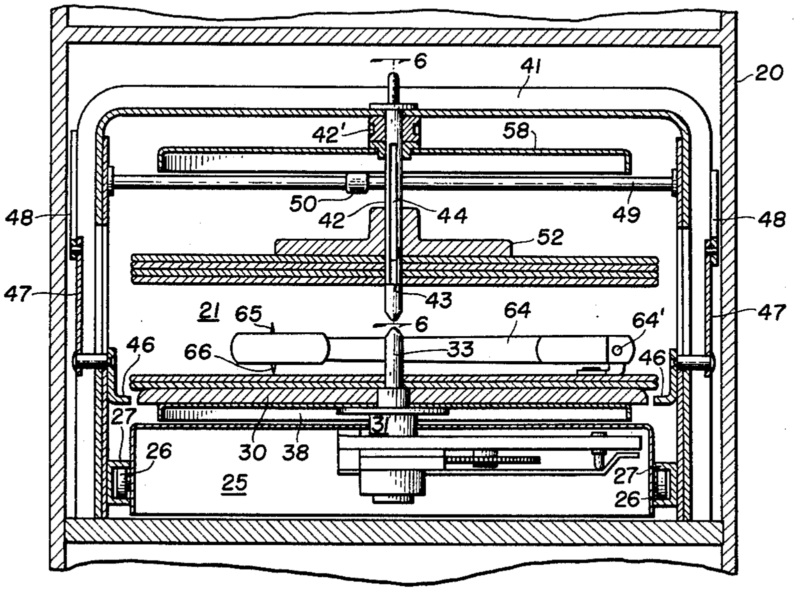
Fig. 3 is a sectional view taken substantially on section line 3—3 of Fig. 1.
Figure 5:
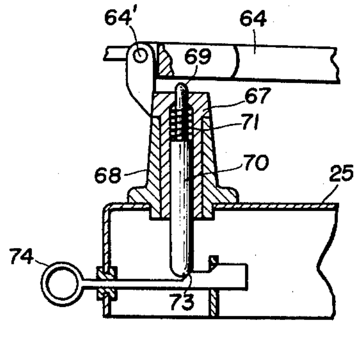
Fig. 5 is a fragmentary sectional view of tone arm mounting mechanism.
Figure 6:
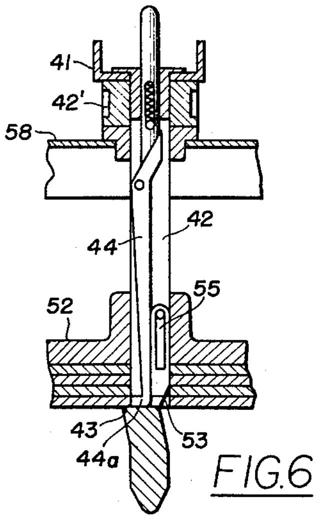
Fig. 6 is a fragmental sectional view of the upper changer spindle.

The operation will be as follows: A group of disks is loaded onto turntable 30 and spindle 33 when the drawer has been pulled out of the cabinet as shown in Fig. 4. The drawer is then closed and moved into the compartment 21 of the cabinet so that the spindle 33 is vertically aligned with spindle 42. Lever 50 is then depressed which will operate shaft 49, arms 48 and links 47 to lift brackets 46 and which will slide the group of disks on turntable 30 upwardly on spindle 33 on spindle 42 until the disks are above the offset 43. The cam surface 53 will move the disks laterally so they will be supported on offset 43. The cam 73 will then be set so that the upper needle 65 on the tone arm will operate on the under face of the lowermost disk on offset 43 while the spindle 42 is driven by disk 58 and motor 57. When that record has been reproduced, the tone arm may be disengaged and swung laterally to clear the disks, and the stem 62 is depressed to operate lever 44 to release the lowermost disk on the spindle 42 from offset 43 so it will slide off spindle 42 onto spindle 33 and drop onto turntable 30. The tone arm may then be engaged with the record on the top face of the disk on turntable for reproducing that record. The tone arm may then be engaged with the under face of the lowermost disk on spindle 42 for reproducing the record thereon. These operations may be repeated until all of the records have been successively reproduced. The drawer may then be pulled out of the cabinet for replacing the group of records, and the operations repeated for the new group.

Figure 7:
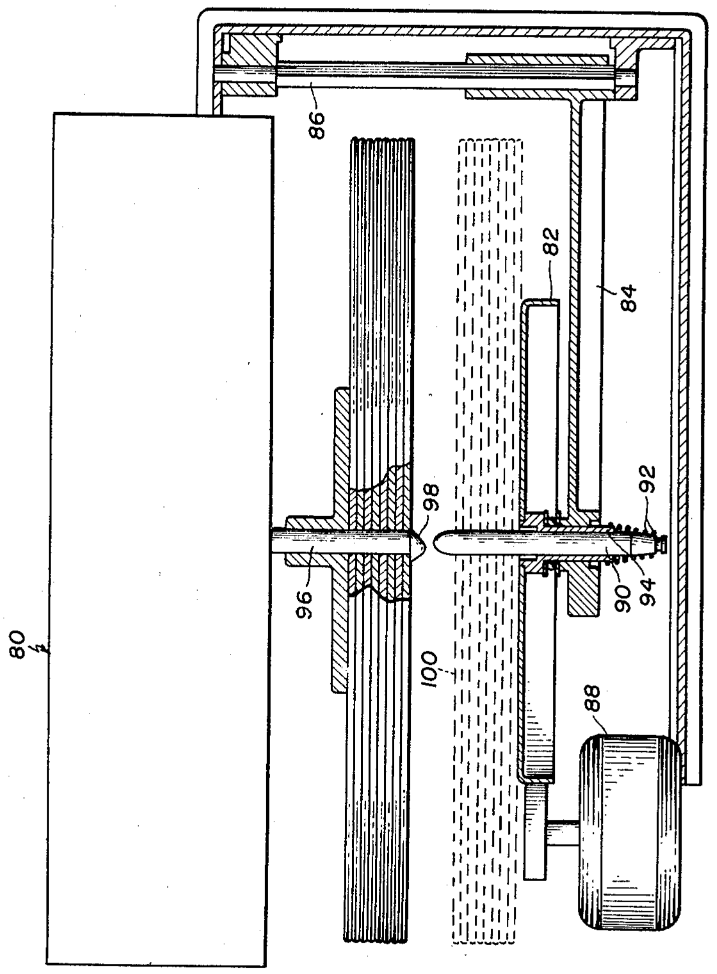
Fig. 7 is a vertical sectional view of another embodiment of this invention.
Figure 8:
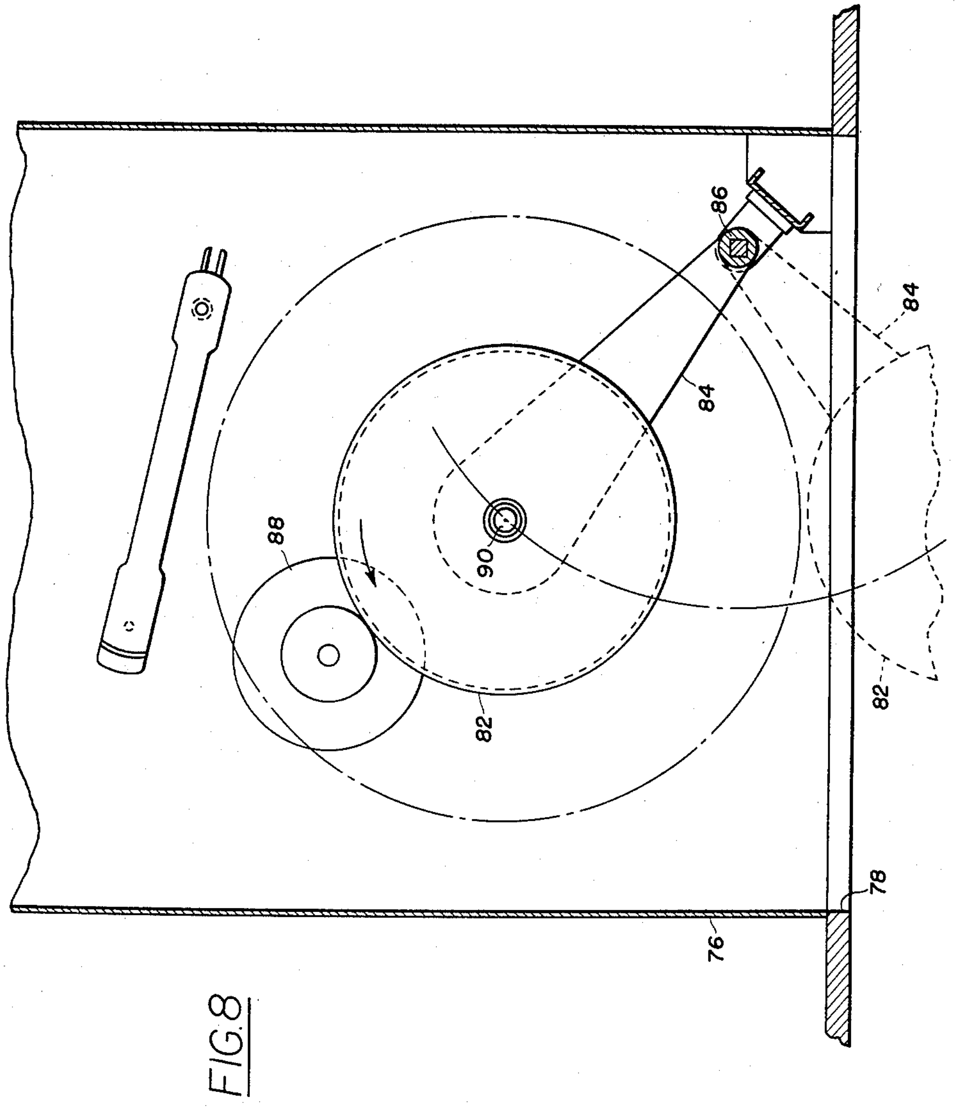
Fig. 8 is a horizontal sectional view of the embodiment of Fig. 7.

Referring now to Figs. 7 and 8, the second embodiment of this invention will now be described. A cabinet 76 having an opening 78 contains suitable record changing and playing mechanism indicated generally by the reference numeral 80. Since this invention is not particularly concerned with any specific type of record changer and playing mechanism, any suitable mechanism known in the prior art may be used. An example of such suitable mechanism is given in the embodiment of Figs. 1 through 6 hereof and other exemplary mechanism which may be adapted to this invention are shown in Thevenaz Patent No. 2,512,121 and Kohn Patent No. 2,178,260. The record carriage or stack-carrying means is pivotally mounted inside the cabinet 76 by means of a supporting arm 84 which is swingable about a vertical post 86. This support arm 84 is movable vertically on the post 86 for a purpose which will be explained more fully hereafter. The record carriage 82 is composed of a rotary turntable which is driven by a suitable motor 88. A spindle 90 is supported centrally of the turntable 82 and is secured in position by means of a helical spring 92 fastened between the lower end of the spindle 90 and a bushing 94 which extends downwardly from the turntable. Thus it is possible to move the turntable 82 upwardly relative to the spindle 90.

Depending from the changer 80 is a second spindle 96 which carries a record-changing detent 98 on its lower end, and which is coaxially positioned with regard to the spindle 90.

The carriage 82 is so positioned inside the cabinet 76 that it can be swung through the cabinet opening 78 to a position completely outside of the cabinet as illustrated by the dashed lines. When the carriage is swung outside of the cabinet, a stack of records 100 is placed thereon. The carriage 82 is then swung through the cabinet opening 78 to its position directly beneath the upper spindle 96. If the changer 80 is of the type to play the records from the upper spindle 96, the supporting arm 84 is raised to cause engagement of the tip of the spindle 90 with the lower end of the upper spindle 96. Continued upward movement of the support arm 84 forces the records 100 onto the upper spindle 96. When all of the records have been transferred to the upper spindle, the arm 84 is lowered to its illustrated position, whereupon the records are sequentially played and handled in the usual manner. In one embodiment of this invention, the records are sequentially played and dropped onto the lower spindle 90 until the entire stack is played. The entire stack is then withdrawn from the cabinet by swinging the arm 84 and carriage 82 through the cabinet opening 78 to the exterior of the cabinet where the records can be replaced with another stack. Thus, it is apparent that the only accessible part of the phonograph mechanism is the carriage 82 when it is removed to the exterior of the cabinet for receiving a stack of records. All of the other phonograph mechanism is mounted on the inside of the cabinet and is completely inaccessible to the operator.

Figure 9:
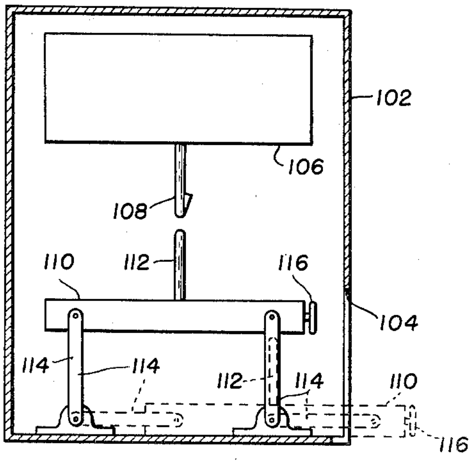
Fig. 9 is a diagrammatic illustration in section of still another embodiment of this invention.

Fig. 9 illustrates another embodiment of this invention wherein the cabinet 102 is provided with an opening 104. Mounted inside the cabinet is a record changer 106 having a depending spindle 108 and a carriage 110 having an upstanding stack-centering spindle 112. The carriage 110 comprises a platform which is pivotally mounted on the cabinet base by means of four suitable links 114. With the links 114 upright as illustrated, the spindle 112 is aligned with the spindle 108. By grasping the knob 116 mounted on the front of the carriage 110 and pulling forwardly through the opening 104, the carriage 110 may be lowered to the illustrated dashed line position to receive a stack of records over the spindle 112. By pushing rearwardly and slightly lifting upwardly, the carriage 104 with the stack of records may be moved interiorly of the cabinet to the full line playing position. The record changing and playing mechanism 106 may be the same as that used in the embodiment of Fig. 1 or any other conventional mechanism capable of playing records from the depending spindle 108.

Figure 10:
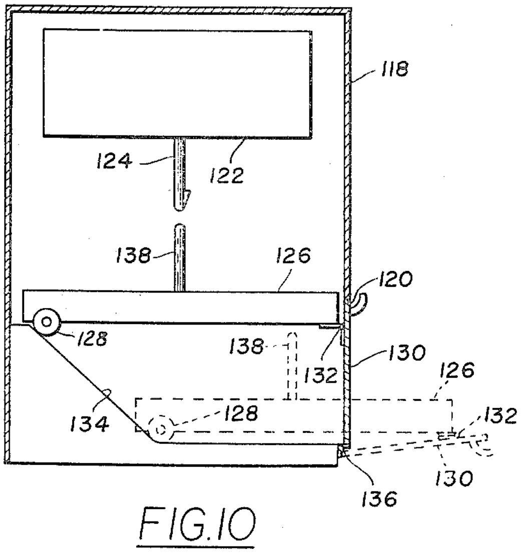
Fig. 10 is a sectional illustration of still a further embodiment of this invention.

A still further embodiment of the invention is illustrated by Fig. 10. This embodiment includes a cabinet 118 having an opening 120. A changer mechanism 122 is mounted in the upper end of the cabinet 118 and provides a depending spindle 124 for receiving records to be played. A carriage 126 is provided with rollers 128 at one end and is fastened to a cabinet door 130 at the other end by means of a suitable hinge 132. The bottom of the cabinet is provided with an inclined ramp 134. At the end of the ramp is provided a hinge 136 for mounting the bottom edge of the door 130. The door 130 is sized to fit into the cabinet opening 120. By raising and lowering the door 130 between the full line and dashed line positions, the carriage 126 may be moved from playing position to record-receiving position. When the door 130 is opened to its dashed line position, a stack of records may be placed on the carriage spindle 138. By lifting the door 130 to its closed position, the carriage 126 is moved inside the cabinet into operative relationship with the changer 122.

It will now be appreciated that this invention provides a unique phonograph mechanism which is not susceptible to mishandling. The mechanism is completely integrated so that there are no loose pieces which can be lost. The only essential requirement of an operator is the placement of a stack of records on the carriage when the latter is swung outwardly away from the changing mechanism. The stack of records are thereafter mechanically handled, whereby manual handling and adjustment of records is reduced to a minimum.

The assembled mechanism of this invention may be completely enclosed in a cabinet, thereby preventing manual manipulation of any of the components thereof. Since it is never necessary in the operation of the mechanism to gain access to the interior of the cabinet, such interior need not be finished, thereby materially simplifying and reducing cabinet costs. Since the mechanism may be mounted interiorly of an unfinished cabinet, the completed phonograph costs less than conventional cabinet-enclosed phonographs. Since the only accessible part of the phonograph is the record carriage when it emerges from the cabinet, even the most inexperienced person may operate the phonograph without fear of damaging it.

What is claimed is:

1. A phonograph comprising a cabinet having an opening through a wall thereof, a first and second rotatable means for supporting a vertical stack of records, the first of said rotatable means being fixedly supported within the cabinet, means mounting the second rotatable means for movement into and out of the cabinet through the opening to receive a stack of records when exterior to the cabinet, transfer means within the cabinet for bodily transferring the stack of records from the second supporting means to the first supporting means when the second supporting means is within the cabinet to expose one side of the lowermost record of the stack for reproduction, means for transferring one record at a time from the first supporting means into stacked relation on the second supporting means for exposing the opposite side of the record and means for reproducing the exposed side of the record in each stack, whereby the played stack of records is movable to a position exteriorly of the cabinet.

2. A phonograph comprising a cabinet having an opening in a wall thereof, a rotatable turntable, means mounting said turntable for movement through the opening into and out of the cabinet for receiving a stack of records when exterior of the cabinet, means mounted within the cabinet for supporting a stack of records, reproducing one side of each record in the stack when lowermost and transferring each played record to the turntable when the latter is within the cabinet, to be stacked thereon with the opposite side exposed, means within the cabinet for bodily transferring a stack of records received by said turntable when exterior of the cabinet, to said record supporting and transferring means mounted within the cabinet, and means for reproducing the opposite side of each record stacked on the turntable whereby the played stack may be moved exteriorly of the cabinet.

3. A phonograph comprising a cabinet having an opening in a wall thereof, means within the cabinet for supporting a stack of records, a rotatable turntable, means on the cabinet supporting said turntable for bodily movement through the opening from a position exterior of the cabinet to receive and support a stack of records to be played, to a position within the cabinet, means within the cabinet for bodily transferring the stack of records on the turntable when the latter is within the cabinet to the stack supporting means, means operatively associated with the stack supporting means for reproducing one side of each record when lowermost on the stack supporting means and transferring the played records to stacked position on the turntable with the other side exposed and means for reproducing the other side of the records on the turntable whereby the played stack of records on the turntable may be moved to a position exteriorly of the cabinet.

4. A phonograph comprising a cabinet, an opening in a wall of the cabinet, a record player and changer supported within the cabinet and comprising a rotatable vertically suspended spindle for supporting a stack of records to be played with the lower side of the bottom record exposed, a horizontal rotatable turntable having a center spindle, means supporting said turntable for movement to and from a position exteriorly of the cabinet to receive and support a stack of records and in a position with its spindle in alignment with the rotatable spindle, means within the cabinet for bodily transferring the received stack of records on the turntable to the rotatable spindle when the turntable spindle is aligned therewith, means for reproducing the lower face of the bottom record on the rotatable spindle and dropping it to the turntable in stacked relation, and means for reproducing the upper face of each top record on the turntable, whereby the played stack thereon may be moved exteriorly of the cabinet.

5. A phonograph in accordance with claim 4 in which the means supporting the turntable is pivotally mounted on the cabinet.

6. A phonograph in accordance with claim 4 in which the means supporting the turntable is slidably mounted on the cabinet.

References Cited in the file of this patent

UNITED STATES PATENTS

| | | |
|---|---|---|
| 2,114,741 | Hill | Apr. 19, 1938 |
| 2,348,766 | Wagner et al. | May 16, 1944 |
| 2,475,744 | Harman | July 12, 1949 |
| 2,657,061 | Sperber | Oct. 27, 1953 |
| 2,685,447 | Ristau et al. | Aug. 3, 1954 |
| 2,777,699 | Woodruff | Jan. 15, 1957 |

FOREIGN PATENTS

| | | |
|---|---|---|
| 668,301 | Great Britain | Mar. 12, 1952 |